(12) United States Patent
Suzuki et al.

(10) Patent No.: US 6,819,453 B1
(45) Date of Patent: Nov. 16, 2004

(54) IMAGE PROCESSING APPARATUS

(75) Inventors: Hiroyuki Suzuki, Toyokawa (JP);
Hideaki Mizuno, Toyokawa (JP);
Hideyuki Toriyama, Toyokawa (JP);
Nobuo Kamei, Toyokawa (JP);
Tsuyoshi Yoneyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 911 days.

(21) Appl. No.: 09/714,099

(22) Filed: Nov. 17, 2000

(30) Foreign Application Priority Data

Nov. 18, 1999 (JP) .......................................... 11-328131

(51) Int. Cl.[7] .............................................. G06K 15/00
(52) U.S. Cl. ...................... 358/1.9; 382/260; 359/11; 430/511
(58) Field of Search .................. 358/404, 444, 358/447, 448, 464, 1.9, 2.1; 250/559.01, 559.05, 559.06, 559.1, 208.1, 277.23, 226; 430/511; 359/11; 382/210, 260, 263

(56) References Cited

U.S. PATENT DOCUMENTS

| | | | | |
|---|---|---|---|---|
| 5,172,000 A | * | 12/1992 | Scheff et al. ................ | 250/550 |
| 5,834,761 A | * | 11/1998 | Okada et al. ............ | 250/208.1 |
| 5,867,634 A | | 2/1999 | Hirota et al. ................ | 395/102 |
| 5,868,666 A | | 2/1999 | Okada et al. ................ | 600/118 |
| 6,335,146 B1 | * | 1/2002 | Noguchi et al. ............ | 430/312 |

FOREIGN PATENT DOCUMENTS

| | | | | |
|---|---|---|---|---|
| JP | 10-271080 | 10/1998 | ............ | H04N/5/38 |
| JP | 11-112753 | 4/1999 | ............ | H04N/1/21 |
| JP | 11-164139 | 6/1999 | ............ | H04N/1/40 |
| JP | 11-317887 | 11/1999 | ............ | H04N/5/14 |

* cited by examiner

Primary Examiner—Jerome Grant, II
(74) Attorney, Agent, or Firm—Burns, Doane, Swecker & Mathis, L.L.P.

(57) ABSTRACT

In an image processing circuit, a color correction section, an area determination section and a MTF correction section each comprises a rewritable device (for example, field programmable gate array (FPGA) circuit) including a plurality of line memories (FIFO memories). A CPU reconstructs the image processing function of the FPGA circuit by using setting information and a processing program stored in the ROM in accordance with the set image processing condition such as the processing speed priority mode or the image quality priority mode.

15 Claims, 13 Drawing Sheets

| -1/4 | -1/4 | 0 |
|------|------|-----|
| 0    | 0    | 1/2 |
| 1/4  | 1/2  | 1/4 |

Fig. 8(a) 2020

| -1/4 | -1/4 | 0   |
|------|------|-----|
| -1/2 | 0    | 1/2 |
| 0    | 1/4  | 1/4 |

Fig. 8(a) — matrix 2020:
| -1/4 | -1/4 | 0   |
| -1/2 | 0    | 1/2 |
| 0    | 1/4  | 1/4 |

Fig. 8(b) — matrix 2021:
| 1/4  | -1/4 | -1/2 |
| 1/2  | 0    | 0    |
| 1/4  | 0    | -1/4 |

Fig. 8(e) 2024: diagonal
1/2, -1, 1/2 (along anti-diagonal)

Fig. 8(f) 2025: diagonal
1/2, -1, 1/2

$$d33 = \min(d11, d12, d13, d14, d15,\\ d21, d22, d23, d24, d25,\\ d31, d32, d33, d34, d35,\\ d41, d42, d43, d44, d45,\\ d51, d52, d53, d54, d55)$$

| d11 | d12 | d13 | d14 | d15 |
|-----|-----|-----|-----|-----|
| d21 | d22 | d23 | d24 | d25 |
| d31 | d32 | d33 | d34 | d35 |
| d41 | d42 | d43 | d44 | d45 |
| d51 | d52 | d53 | d54 | d55 |

5 × 5 Min Filter 226

Fig. 11(a)

| −1/4 | 0 | 0 | 0 | −1/4 |
|------|---|---|---|------|
| 0    | 0 | 0 | 0 | 0    |
| 0    | 0 | 1 | 0 | 0    |
| 0    | 0 | 0 | 0 | 0    |
| −1/4 | 0 | 0 | 0 | −1/4 |

Laplacian Filter 222

Fig. 12(a)

| -1/4 | 0 | -1/4 |
|---|---|---|
| 0 | 1 | 0 |
| -1/4 | 0 | -1/4 |

Laplacian Filter 222

Fig. 12(b)

| d11 | d12 | d13 | d14 | d15 |
|---|---|---|---|---|
| d21 | d22 | d23 | d24 | d25 |
| d31 | d32 | d33 | d34 | d35 |
| d41 | d42 | d43 | d44 | d45 |
| d51 | d52 | d53 | d54 | d55 |

$d33 = \min(d22, d23, d24, d32, d33, d34, d42, d43, d44,)$

3 × 3 Min Filter 226

Fig. 13

IMAGE PROCESSING APPARATUS

CROSS-REFERENCE TO RELATED APPLICATIONS

This application is based on application No. 11-328131 filed in Japan, the contents of which are hereby incorporated by reference.

BACKGROUND OF THE INVENTION

1. Field of the Invention

The present invention relates to an image processing apparatus for processing image data, and more particularly, to an image processing apparatus using a rewritable device.

2. Description of the Related Art

A real-time image processing apparatus optimally processes image data read by a one-dimensional image sensor of a reader in real time, and sends the processed image data to an outputter. Here, a plurality of line memories (for example, FIFO memories) are used in an image processing circuit mainly using a spatial filter. The size, the number and the configuration of the line memories are univocally decided in accordance with a predetermined image processing condition, for example, the image quality, the output image size or the reading rate depending on the reading resolution of the image sensor, or the processing speed required in accordance with the printer system speed. Likewise, the configuration of circuits associated with the line memories and the image processing algorithm are univocally decided. Therefore, when the user changes the image processing condition such as the image quality, the output image size or the processing speed, since the configuration of the line memories for image processing and the image processing algorithm are always the same, there are cases where optimal image processing is not performed to degrade the image quality. Moreover, even when it is intended to output a high-quality image, since the configuration of the line memories for image processing and the image processing algorithm are always the same, the image quality cannot be improved to the desired level.

OBJECTS AND SUMMARY

An object of the present invention is to provide an image processing apparatus in which the configurations of line memories and circuits associated therewith, and the image processing algorithm can be changed in accordance with the image processing condition.

An image processing apparatus according to a first aspect of the invention is provided with: an image processing circuit including a plurality of line memories, a first processing section performing a first image processing using a spatial filter and a second processing section performing a second image processing using a spatial filter, and consist of a device whose circuit configuration is rewritable; a memory for storing therein setting information for rewriting the configuration of the device; and a controller rewriting the configuration of the line memories and the configuration of the first and the second processing sections by use of the setting information stored in the memory based on an image processing condition.

An image processing apparatus according to a second aspect of the invention is provided with: an image processing circuit comprising a device whose circuit configuration is rewritable, and including a first processing section performing a first image processing and a second processing section performing a second image processing; a memory for storing therein setting information for rewriting the configuration of the device; setting means for selectively setting a first mode and a second mode; and a controller rewriting, by use of the setting information stored in the memory, the configuration of the first and the second processing sections so that the first and the second processing sections are configured so as to simultaneously operate in the first mode and to time-sharedly operate in the second mode.

These and other objects, advantages and features of the invention will become apparent from the following description thereof taken in conjunction with the accompanying drawings which illustrate specific embodiments of the invention.

BRIEF DESCRIPTION OF THE DRAWINGS

FIGS. 7(a–i) show feature amount extraction filters in the image quality priority mode;

FIGS. 8(a–i) show feature amount extraction filters in the speed priority mode;

In the following description, like parts are designated by like reference numbers throughout the several drawings.

DESCRIPTION OF THE PREFERRED EMBODIMENTS

Hereinafter, an embodiment of the present invention will be described with reference to the accompanying drawings. In the figures, like reference numbers designate like parts.

Figure 1:
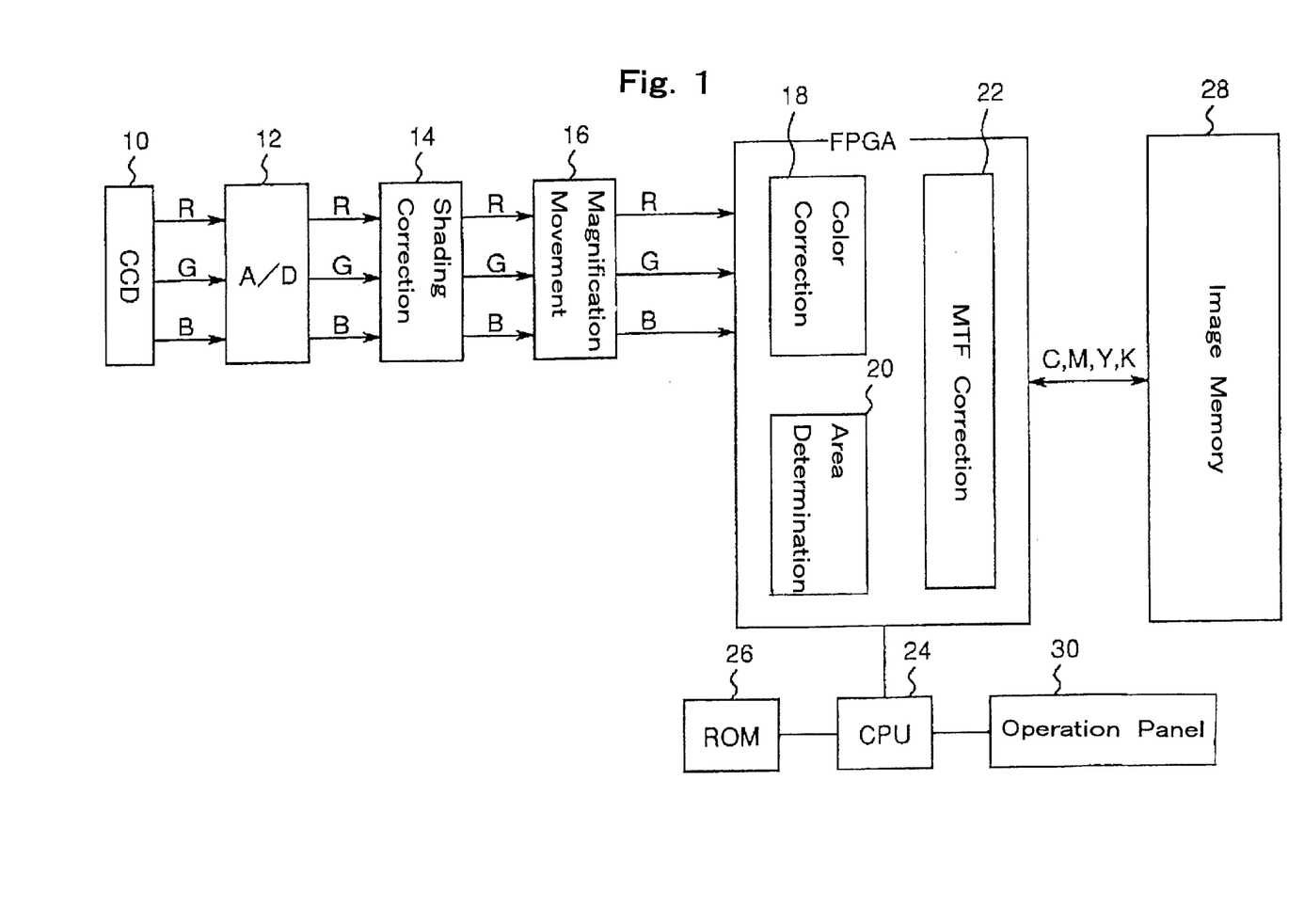
FIG. 1 shows the general configuration of a color image processing circuit.

FIG. 1 shows the general configuration of a color image processing circuit of a digital copier. The red, green and blue output signals of a color CCD sensor 10 comprising line sensors of three colors are converted into digital signals by an A/D conversion section 12. The obtained red (R), green (G) and blue (B) digital image data are shading-corrected by a shading correction section 14 and supplied to a scaling and movement section 16, where scaling and movement are performed. The output image data from the scaling and movement section 16 are converted into print colors of cyan (C), magenta (M), yellow (Y) and black (K) by a color correction section 18, and determination of areas is performed by an area determination section 20. An MTF correction section 22 MTF-corrects the image data output from the color correction section 18 in accordance with the result of the determination by the area determination section 20, and outputs the corrected image data to a printer. The color correction section 18, the area determination section 20 and the MTF correction section 22 perform the processings by use of an image memory 28 as detailed later. The user sets, with an operation panel 30, the image processing condition (copy mode) such as the copy count, the output image size (output sheet size), a processing speed priority mode and an image quality priority mode.

The color correction section 18, the area determination section 20 and the MTF correction section 22 each comprises a rewritable device (for example, field programmable gate array (FPGA) circuit) including a plurality of line memories (FIFO memories). The FPGA is an integrated circuit in which the logic circuit is reconstructed based on predetermined setting information. The image processing function is reconstructed by this integrated circuit. The setting information used in the reconstruction of the image processing function is stored in a ROM 26. A CPU 24 reconstructs the image processing function of the FPGA circuit by using the setting information and a processing program stored in the ROM 26 in accordance with the set image processing condition such as the processing speed priority mode or the image quality priority mode. By doing this, the CPU 24 changes the processing algorithm of the FPGA circuit (the color correction section 18, the area determination section 20 and the MTF correction section 22) based on the processing program in the ROM 26. The FPGA circuit includes a plurality of FIFO memories (line memories) for filtering of the area determination section 20 and the MTF correction section 22. As described later, the number of FIFO memories included and the allocation of the FIFO memories are rearranged in accordance with the image processing condition. That is, the configuration of the FIFO memories is changed in accordance with the image processing condition.

Next, the speed priority mode and the image quality priority mode set with the operation panel 30 will be described. When the processing speed priority mode is selected, speed-oriented image processing is performed. When the image quality priority mode is selected, quality-oriented image processing is performed. The CPU 24 changes the processing algorithm of the FPGA circuit (the color correction section 18, the area determination section 20 and the MTF correction section 22) based on the processing program and the setting information in the ROM 26 in accordance with the mode set with the operation panel 30.

Figure 2:
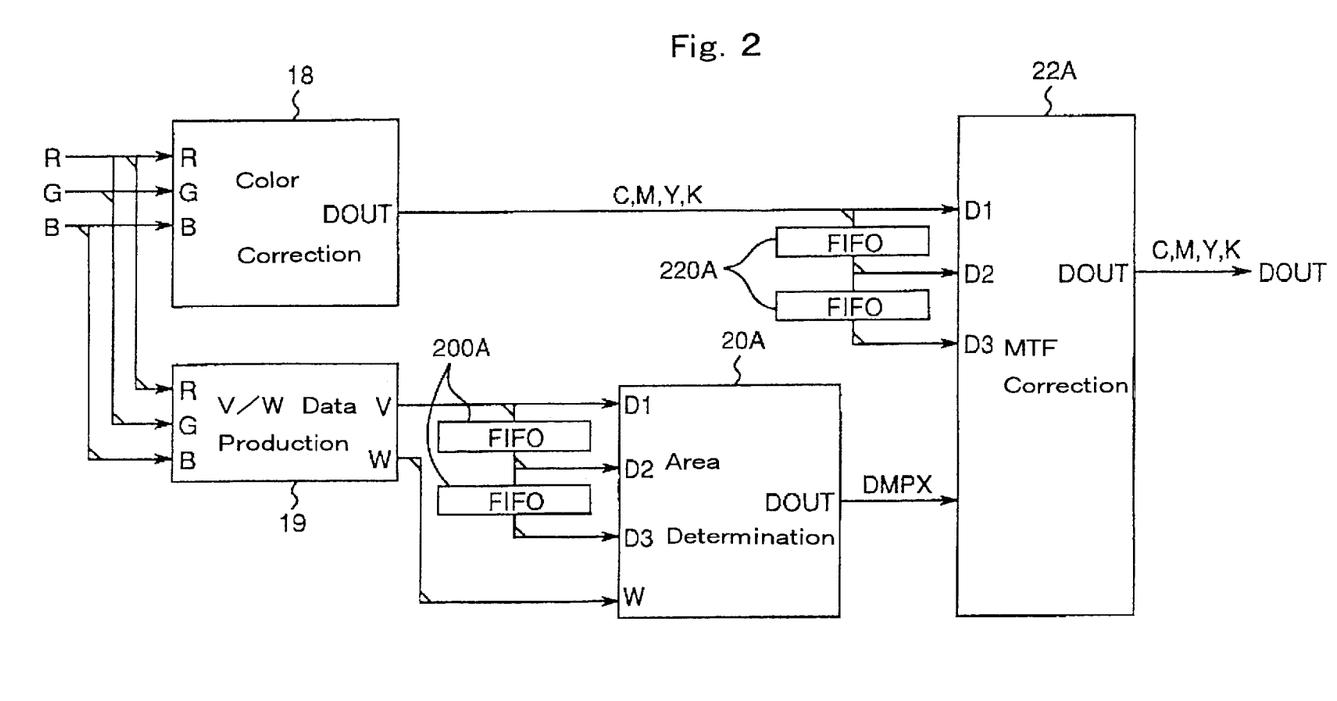
FIG. 2 is a block diagram showing the configuration of an FPGA circuit in a speed priority mode.

FIG. 2 shows the configuration of the FPGA circuit in the speed priority mode. Since the image data used in this embodiment is for a resolution of 400 dpi and an image reading size of A3, as line memories (FIFO memories) 200A and 220A for image processing, ones with a size of 5 k×8 bits are used. The R, G and B image data are first converted into print data of C, M, Y and K by the color correction section 18 and are then optimized by an MTF correction section 22A using a 3×3 filter comprising two line memories (FIFO memories) 220A. At the same time, the R, G and B image data are converted into lightness data (V) and chroma data (W) by a lightness/chroma data production section 19 and are then area-determined by an area determination section 20A using a 3×3 filter comprising two line memories (FIFO memories) 200A, so that an area determination attribute signal (DMPX) is produced. The DMPX signal is used as a control signal when the C, M, Y and K data are optimized by the MTF correction section 22A.

Figure 3:
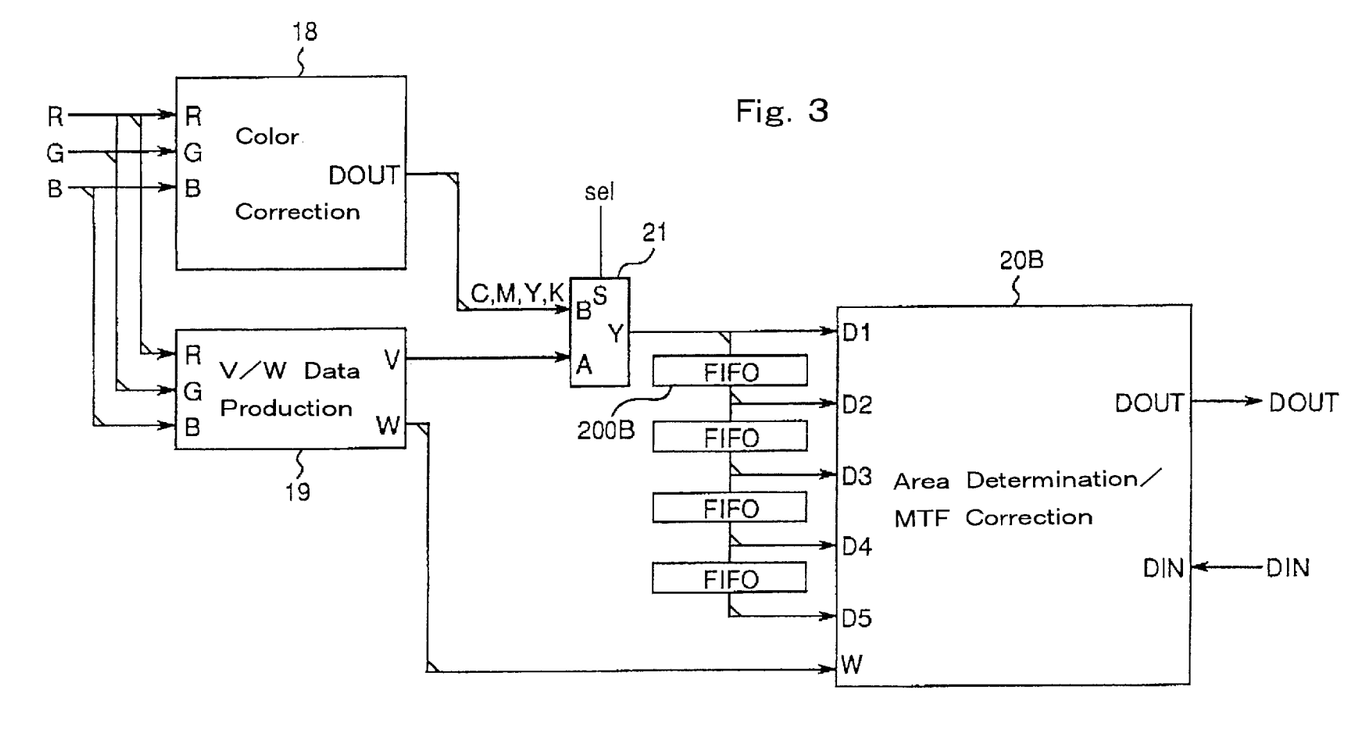
FIG. 3 is a block diagram showing the configuration of the FPGA circuit in an image quality priority mode.

FIG. 3 shows the configuration of the FPGA circuit in the image quality priority mode. In this circuit, the disposition of a plurality of 5 k×8-bit FIFO memories included is different from that in the speed priority mode. An area determination section/MTF correction section 20B is time-sharedly rewritten so as to be configured as the area determination section 20 shown in FIG. 5 when area determination is performed and to be configured as the MTF correction section 22 shown in FIG. 9 when MTF correction is performed. First, with a Sel signal of a selector 21 being low, the algorithm of the area determination section/MTF correction section 20B is set so as to be for the area determination section. After the R, G and B image data are converted into the lightness data (V) and the chroma data (W) by the lightness/chroma data production section 19, the lightness data (V) is input to a part where four FIFO memories 200B are cascaded. Then, the area determination section 20B using a 5×5 filter to which five lines of data are input produces the area determination attribute signal (DMPX) and temporarily stores the signal in the image memory 28 (FIG. 1). After the area determination is finished, the Sel signal of the selector 21 is made high, and the algorithm of the area determination/MTF correction section 20B is set so as to be for MTF correction. The C, M, Y and K data from the color correction section 18 are supplied by way of the selector 21 to the part where the four FIFO memories 200B are cascaded. Then, the MTF correction section 20B using the 5×5 filter to which five lines of data are input optimizes the C, M, Y and K data from the color correction section 18 by use of the area determination attribute signal (DMPX) that was stored in the image memory 28 just a while ago, and outputs the optimized data.

Figure 4:
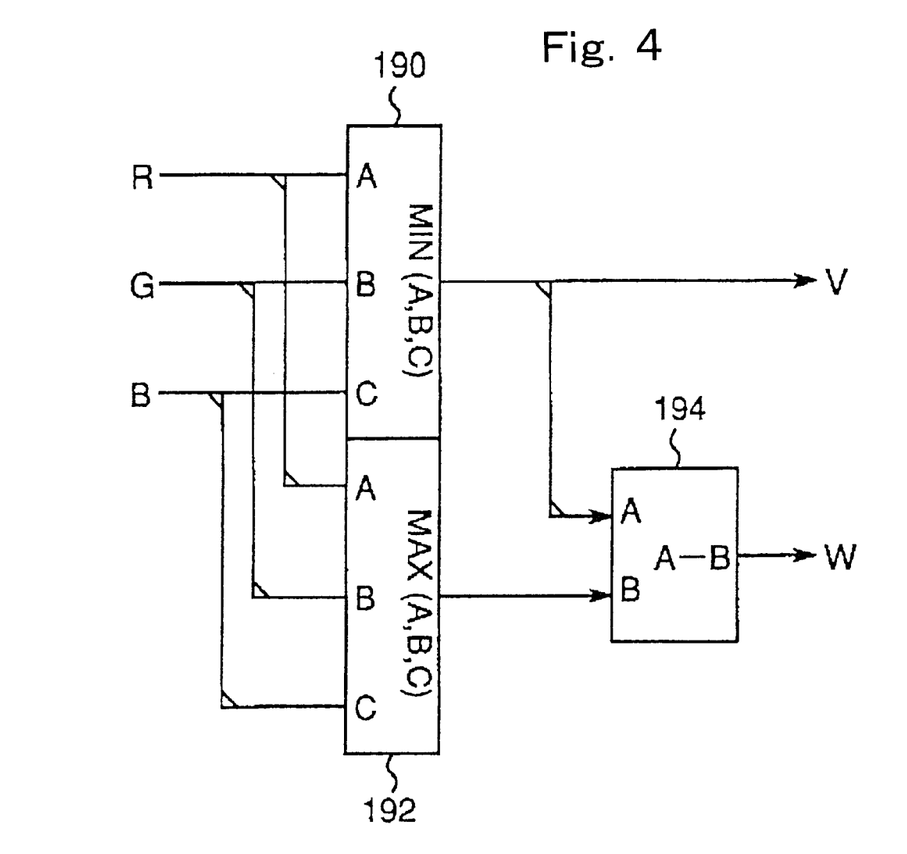
FIG. 4 is a block diagram of a lightness/chroma data production section.

The circuit configuration will be further described. FIG. 4 shows the lightness/chroma data production section 19. This internal configuration is common to the speed priority mode and the image quality priority mode. The lightness data (V) is obtained as the minimum value of the R, G and B image data by a MIN circuit 190. The chroma data (W) is obtained as the difference between the maximum value and the minimum value of the R, G and B image data obtained by a MAX circuit 192 and the MIN circuit 190 which difference is obtained by inputting the maximum value and the minimum value to a subtracter 194.

Figure 5:
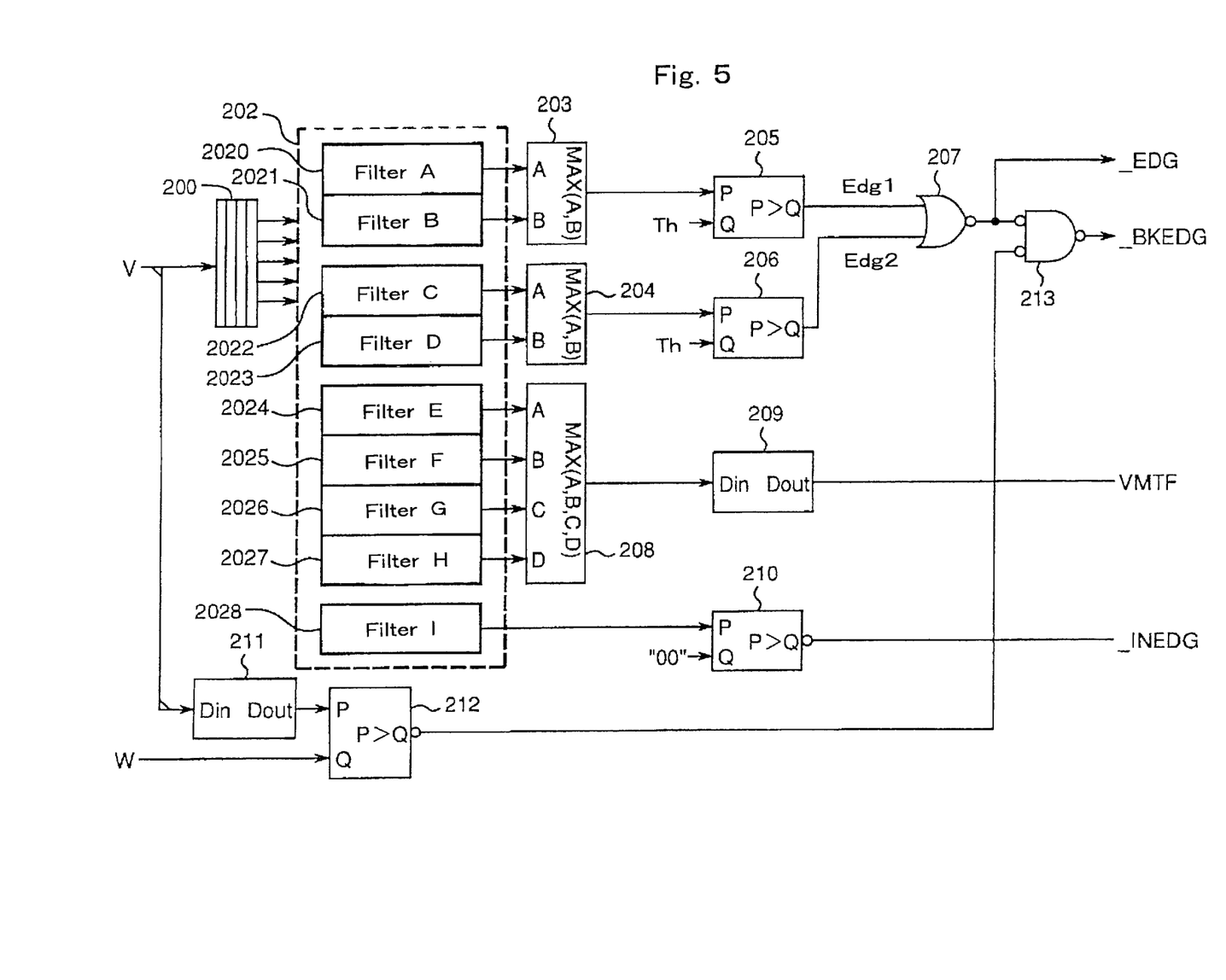
FIG. 5 is a block diagram of a part of an area determination section.
Figure 6:
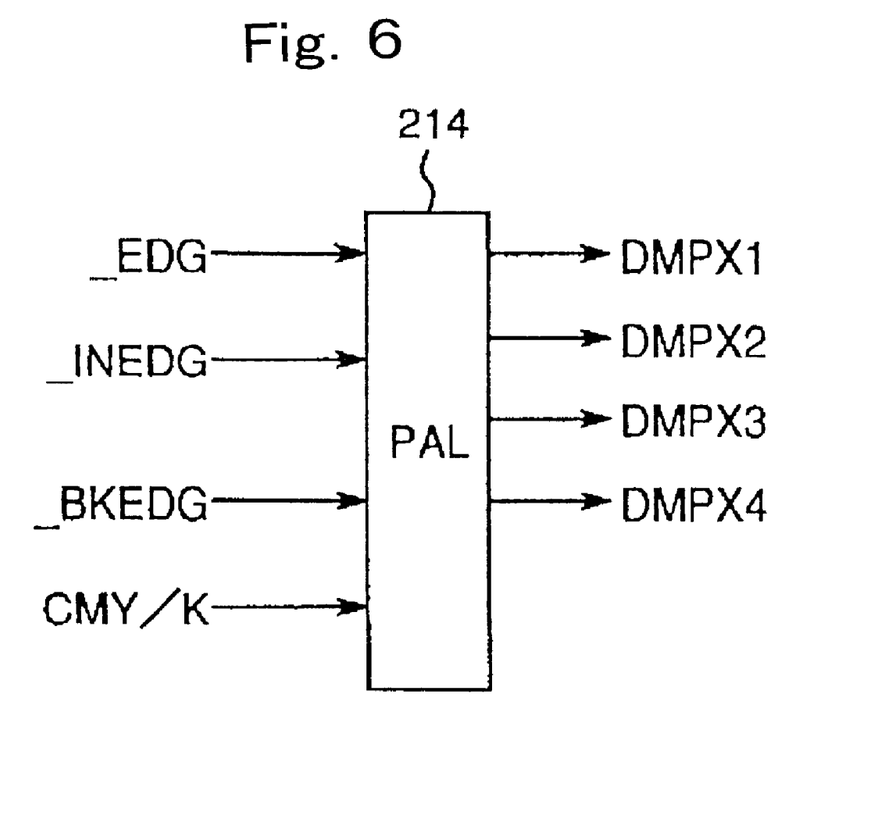
FIG. 6 is a block diagram of a part of the area determination section.
Figures 7A, 7B:
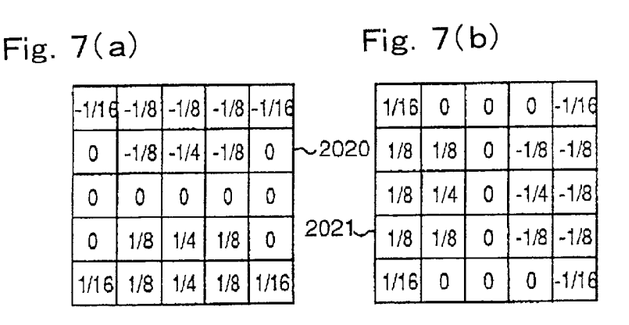
Figures 7C, 7D:
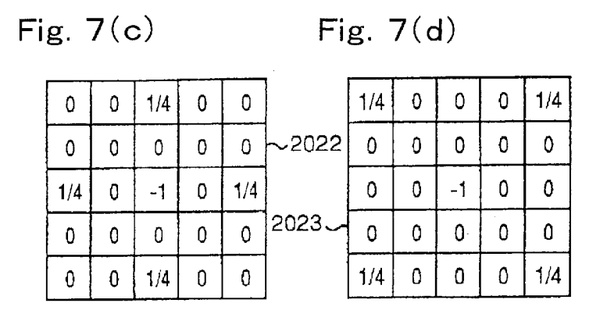
Figure 7E:
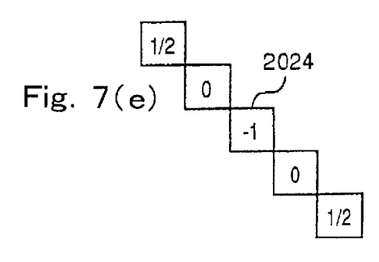
Figure 7F:
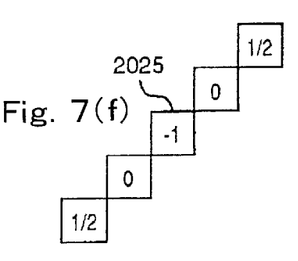
Figure 7G:
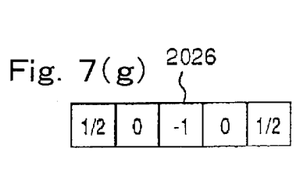
Figure 7H:
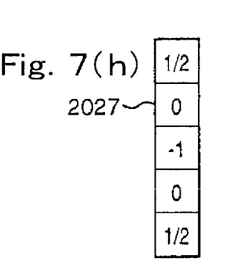
Figure 7I:
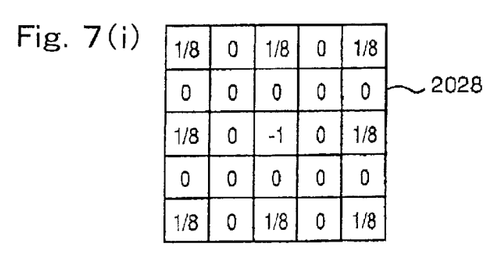
Figure 8A:
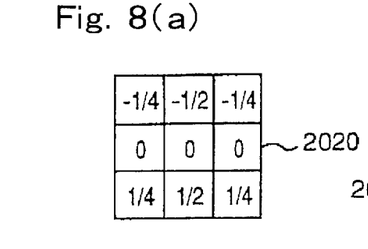
Figure 8B:
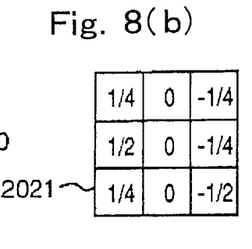
Figure 8C:
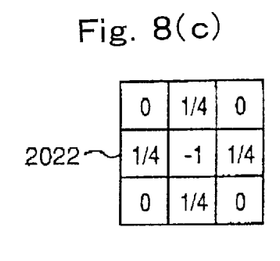
Figure 8D:
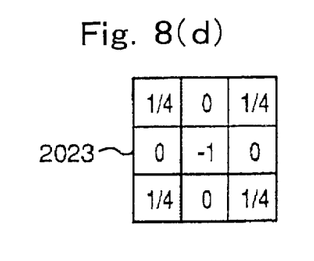
Figure 8E:
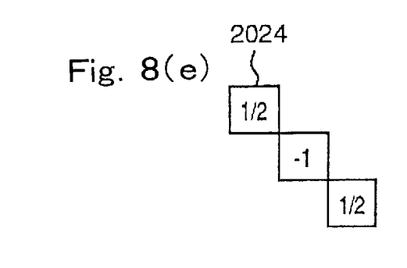
Figure 8F:
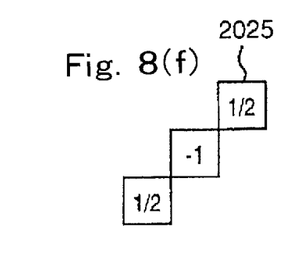
Figure 8G:
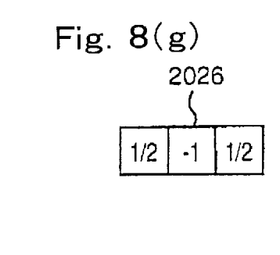
Figure 8H:
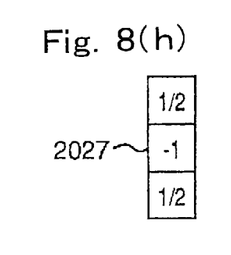
Figure 8I:
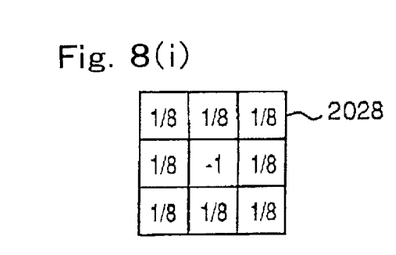

FIGS. 5 and 6 show the configuration of the area determination section 20 in the image quality priority mode. Based on the lightness data (V) obtained by the lightness/chroma data production section 19, various feature amount signals (an edge portion signal _EDG, a black edge portion signal _BKEDG, a lightness edge amount VMTF, and a within-edge signal _INEDG) are produced by a matrix formation section 200, a feature amount detection filter 202 and the like. The sign "_" at the head of the reference designations representing the signals indicates that the signals are negative logic signals.

The matrix formation section 200 forms a 5×5 matrix of the lightness data from the input lightness data by use of the four line memories 200B. The feature amount detection filter 202 processes the data of the matrix formation section 200 by use of various filters. The figure shows the matrix formation section 200 in the image quality priority mode. In the speed priority mode, a 3×3 matrix of the lightness data is formed by use of two line memories.

Of the feature amount data obtained by main scanning linear differential filters 2020 (filter A) and sub scanning linear differential filter 2021 (filter B) of the feature amount detection filter 202, the maximum value obtained by a MAX circuit 203 is compared with an edge portion threshold value (Th) by a comparator 205, and of the feature amount data obtained by two kinds of, that is, + and × quadratic differential filters 2022 (filter C) and 2023 (filter D), the maximum value obtained by a MAX circuit 204 is compared with the edge threshold value (Th) by a comparator 206. When either of the maximum values is higher than the threshold value, an OR gate 207 outputs the edge portion signal _EDG.

A MAX circuit 208 outputs the maximum value of the feature amount data obtained by −45-, 0-, 45- and 90-degree differential filters 2024 (filter E), 2025 (filter F), 2026 (filter G) and 2027 (filter H) in the feature amount detection filter 202. The maximum value is converted into the lightness edge amount VMTF through a lightness MTF table 209.

When a comparator 210 determines that the data produced by a within-edge detection filter 2028 (filter I) in the feature amount detection filter 202 is positive, the within-edge signal _INEDG is output.

The lightness data (V) is converted through a black determination threshold value table 211. When a comparator 212 determines that the chroma data (W) is lower than the threshold value, an AND gate 213 outputs the black edge signal _BKEDG in a case where the _EDG signal is active.

Then, a logic circuit PAL214 (FIG. 6) produces attribute signals DMPX1 to DMPX4 associated with area determination from the feature amount signals (_EDG, _INEDG and _BKEDG) and a color code signal (CMY/K). Here, DMPX1 is a smoothing selection signal, DMPX2 is a MIN filter selection signal, DMPX3 is a lightness/density edge amount selection signal, and DMPX4 is an edge amount clearing signal.

FIGS. 7(a–i) show the nine feature amount extraction filters 2020 to 2028 for the image quality priority mode used in the area determination section 2. These filters all have a matrix size of 5×5.

Next, the area determination section 20A in the speed priority mode will be described. No basic block circuit diagrams are shown because they are common to FIGS. 5 and 6; however, the configurations of the matrix formation section 200 and the feature amount extraction filter 202 are different from those in the image quality priority mode.

In the matrix formation section 200 in the speed priority mode, the 3×3 matrix of the lightness data is formed by use of two line memories 200A.

The configurations of the filters 2020 to 2028 of the feature amount extraction filter 202 in the speed priority mode are shown in FIGS. 8(a–i). These filters all have a matrix size of 3×3.

Figure 9:
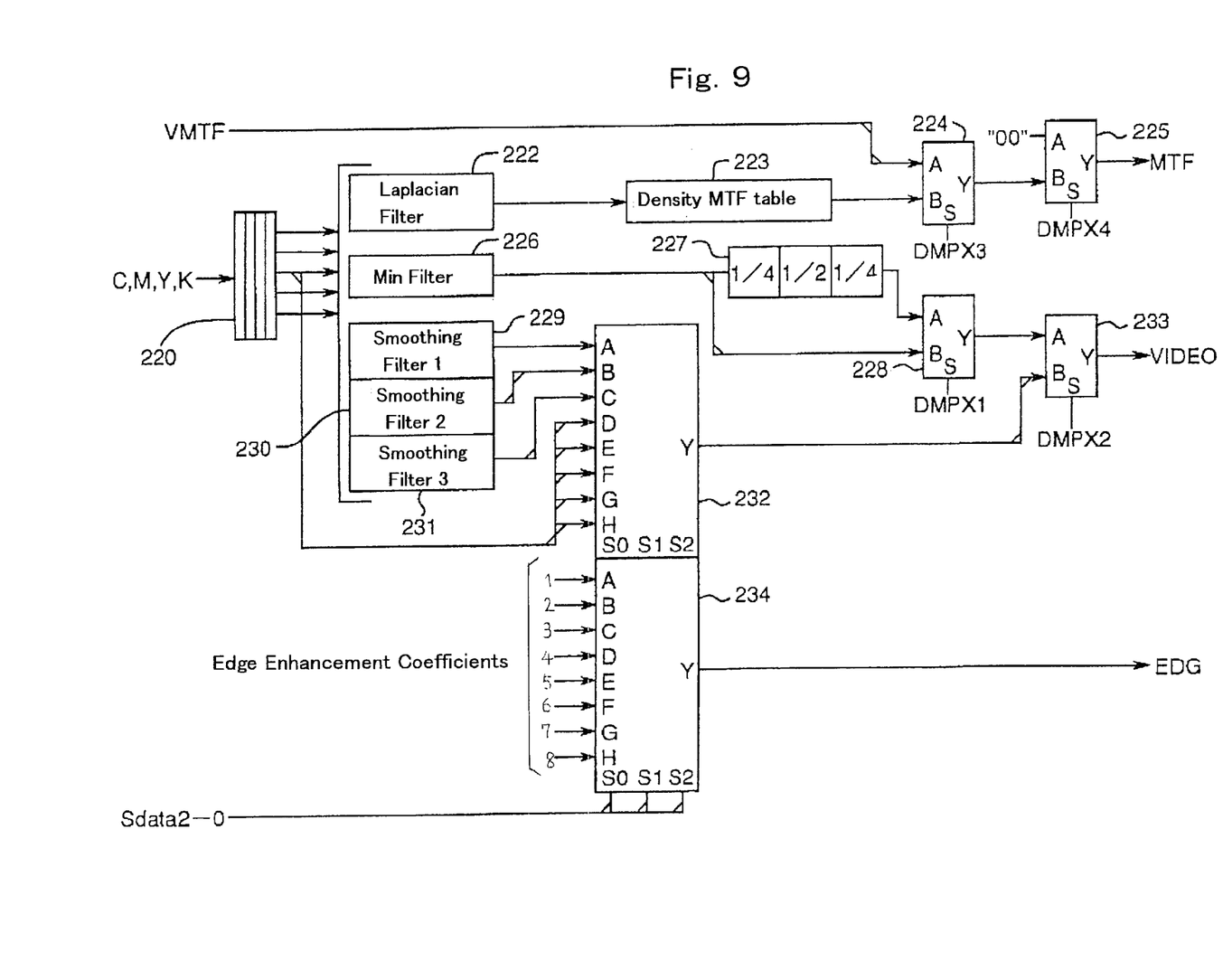
FIG. 9 is a block diagram of a part of an MTF correction section.
Figure 10:
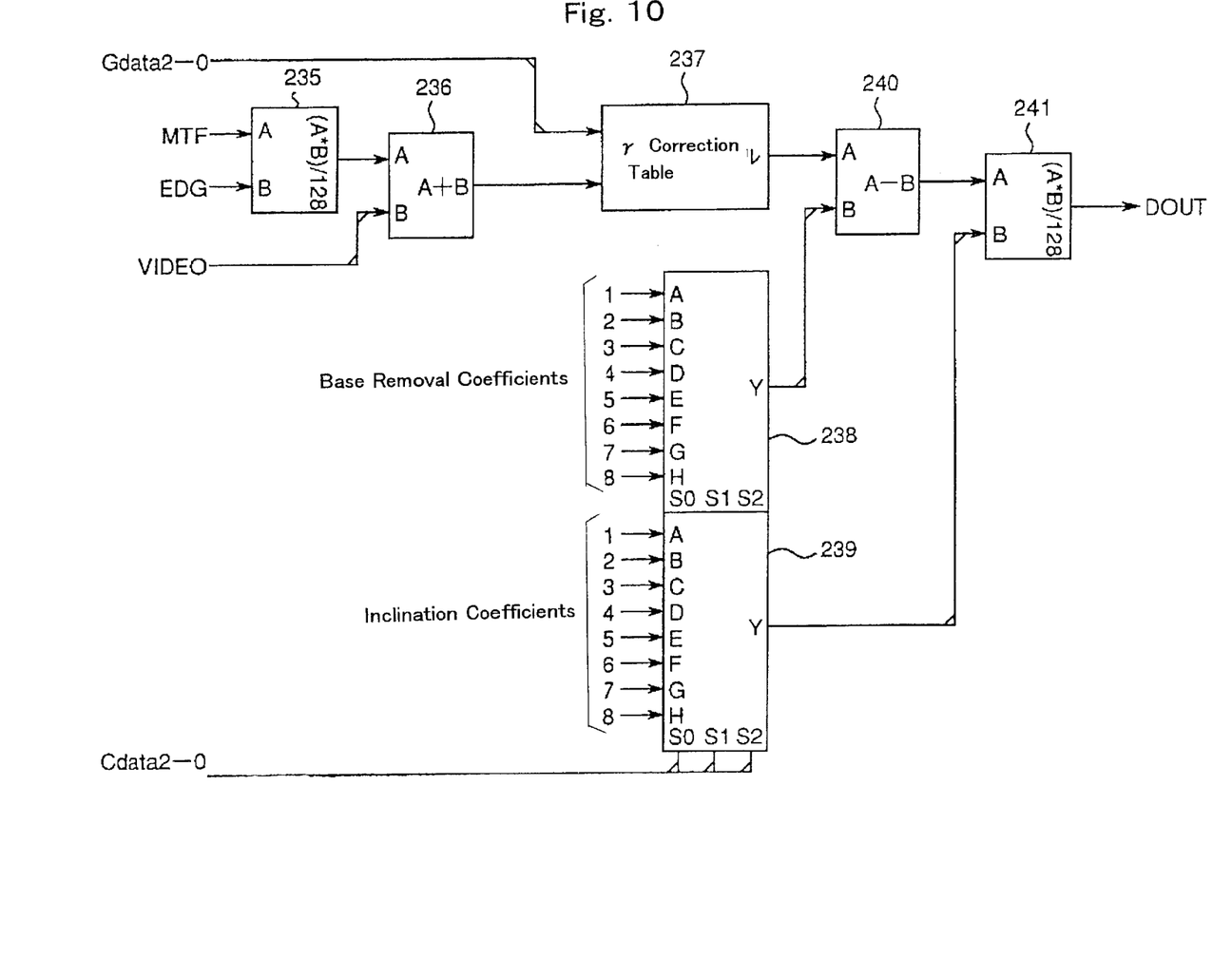
FIG. 10 is a block diagram of a part of the MTF correction section.

FIGS. 9 and 10 show the MTF correction section 22 in the image quality priority mode. The MTF correction section 22 produces an edge amount MTF, base image data VIDEO and an edge enhancement amount coefficient EDG based on the VMTF data and the signals DMPX1 to DMPX4 produced by the area determination section 20 and an externally supplied 3-bit sharpness switching signal Sdata, and based on these, corrects the C, M, Y and K data obtained by the color correction section 18.

The C, M, Y and K data are first input to a 5×5 matrix in a matrix formation section 220. The data from the matrix formation section 220 is then processed by various filters and various feature amounts are output.

The feature amount obtained from the C, M, Y and K data by a Laplacian filter 222 is converted into a density edge amount through a density MTF table 223. A selector 224 selects the density edge amount MTF and the lightness edge amount VMTF based on the signal DMPX3 (lightness/density edge amount switching signal), and the selected data is output by way of a selector 225. The selector 225 clears the edge amount MTF to "00" based on the signal DMPX4 (edge clearing signal).

The C, M, Y and K data having been processed by a MIN filter 226 are smoothed by a smoothing filter 227. A selector 228 selects the smoothed data or unsmoothed data based on the signal DMPX1 (smoothing selection signal). Then, based on the signal DMPX2 (MIN filter selection signal), a selector 233 selects the output data of the selector 228 and data selected by a selector 232 based on the sharpness switching signal Sdata which data is produced from the C, M, Y and K data by use of three kinds of smoothing filters 229, 230 and 231. Consequently, the base image data VIDEO is produced.

The edge enhancement coefficient EDG is one selected from among eight edge enhancement coefficients by a selector 234 based on the sharpness switching signal Sdata.

Data obtained by multiplying the edge amount MTF by the edge enhancement coefficient EDG by a multiplier 235 is added to the base image data VIDEO by an adder 236. The addition value is gamma-corrected through a gamma correction table 237 switched by an externally supplied 3-bit gamma correction switching signal Gdata. A selector 238 produces a base removal value from eight base removal coefficients based on an externally supplied 3-bit color balance switching signal Cdata, and a subtracter 240 subtracts the removal value from the output value of the gamma correction table 237. Then, a selector 239 produces an inclination correction value from eight inclination coefficients based on the 3-bit color balance switching signal Cdata, and a multiplier 241 multiplies the output value of the subtracter 240 by the inclination correction value. Consequently, data DOUT having been MTF-corrected is output.

Figure 11A:
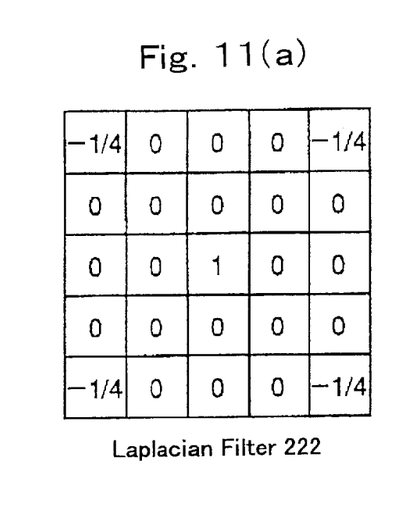
FIGS. 11A and 11B show MTF correction filters in the image quality priority mode.
Figure 11B:
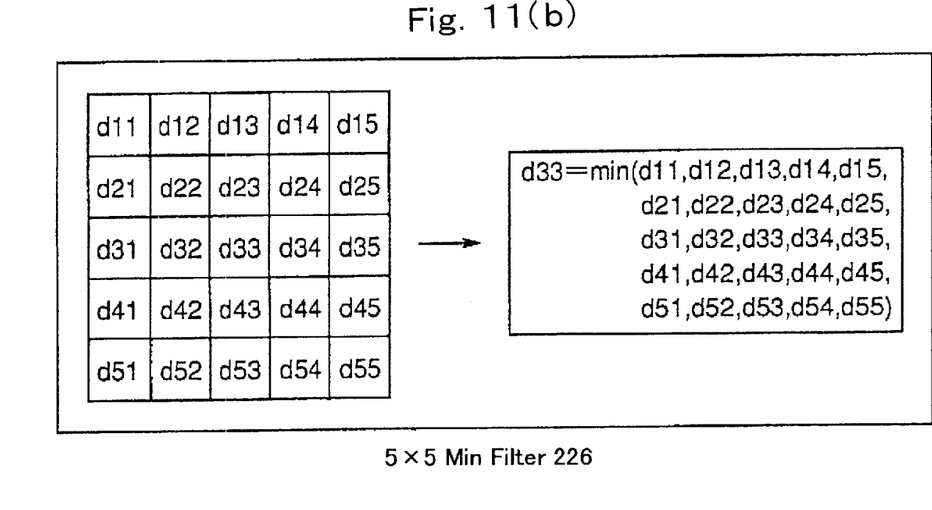

FIGS. 11(a–b) show the MIN correction filters (the 5×5 Laplacian filter 222 and the 5×5 MIN filter 226) in the image quality priority mode.

Next, the MTF correction section 22A in the speed priority mode will be described. No basic block circuit diagrams are shown because they are common to FIGS. 9 and 10; however, the configurations of the matrix formation section 220A and the MTF correction filter are different from those in the image quality priority mode.

In the matrix formation section 220 in the speed priority mode, a 3×3 matrix is formed for each of the C, M, Y and K image data by use of two line memories 220A.

Figure 12A:
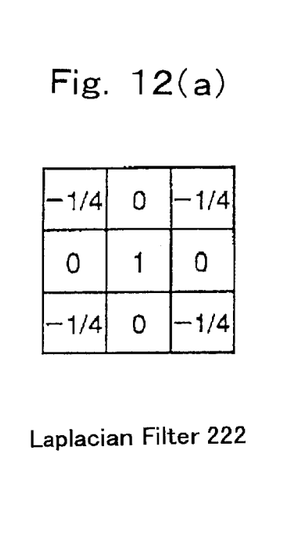
FIGS. 12A and 12B show MTF correction filters in the processing speed priority mode.
Figure 12B:
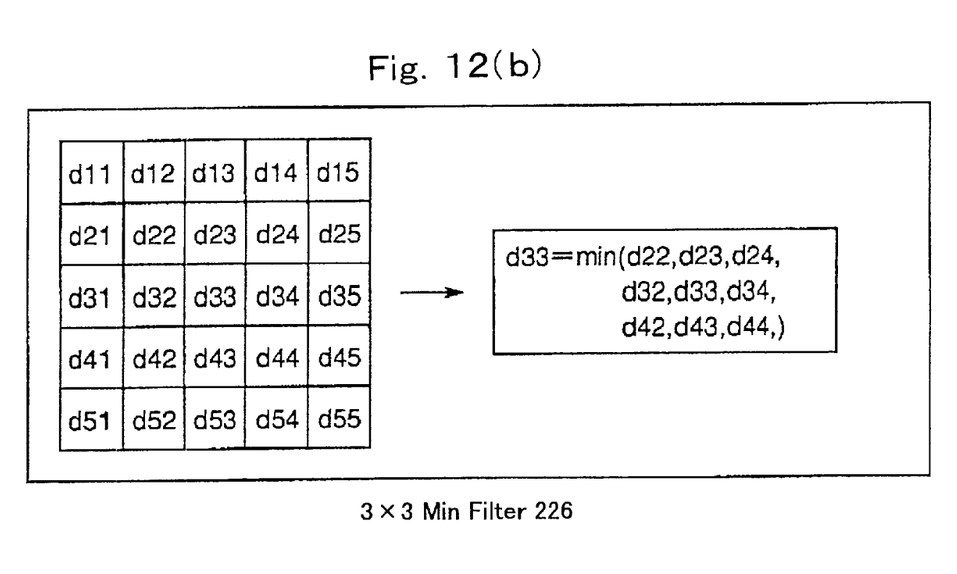

FIGS. 12(a–b) show the MTF correction filters (the 3×3 Laplacian filter 222 and the 3×3 MIN filter 226) in the processing speed priority mode.

Figure 13:
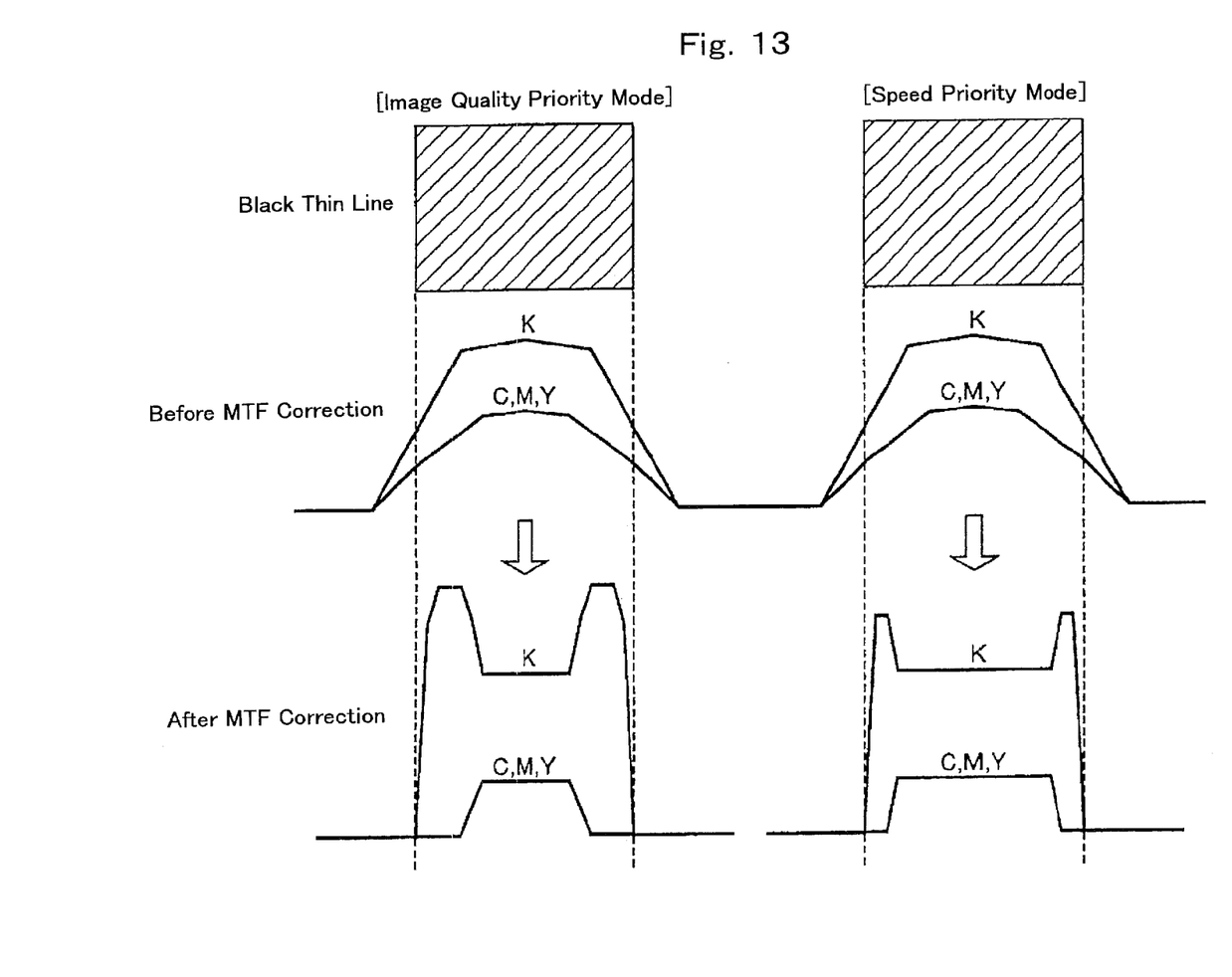
FIG. 13 shows the image quality difference between the image quality priority mode and the processing speed priority mode when black thin lines are processed.

FIG. 13 shows the image quality difference between the image quality priority mode and the speed priority mode when black thin lines are processed. The image quality priority mode in which the edge enhancement of K is strong and the attenuation amounts of C, M and Y are large at the edge portions of black thin lines is more excellent in black thin line reproducibility than the speed priority mode.

While the image processing condition can be set by the user with the operation panel, when an original manually placed on a platen is read, the image quality priority mode may be set irrespective of the setting. When the registered number (copy count) is larger than a predetermined number, the processing speed priority mode may be set irrespective of the setting. When the number of originals is small, the image quality priority mode may be set irrespective of the setting.

Since the algorithm of the image processing circuit and the configuration of the FIFO memories can be changed as described above, image processing can be performed in accordance with the copy condition.

In addition, the circuit configuration associated with area determination, filtering such as the MTF correction and the like in the image processing circuit can be reconstructed in accordance with the image processing condition desired by the user. Consequently, the image processing algorithm can be changed to ones suitable for various image processing conditions, so that the quality of output images is improved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus comprising:
    an image processing circuit including a plurality of line memories, a first processing section performing a first image processing using a spatial filter and a second processing section performing a second image processing using a spatial filter, and consist of a device whose circuit configuration is rewritable;
    a memory for storing therein setting information for rewriting the configuration of the device; and
    a controller for rewriting the configuration of the line memories and the configuration of the first and the second processing sections by use of the setting information stored in the memory based on an image processing condition.

2. An image processing apparatus as claimed in claim 1, wherein said controller assigns the number of line memories used in the first and the second processing sections in accordance with the image processing condition.

3. An image processing apparatus as claimed in claim 1, wherein the first image processing is area determination in which area determination of image data is performed by use of a spatial filter, and the second image processing is MTF correction in which MTF correction of image data is performed by use of a spatial filter.

4. An image processing apparatus as claimed in claim 3, wherein the MTF correction of image data in the second image processing is performed in accordance with the result of the area determination in the first image processing.

5. An image processing apparatus as claimed in claim 1, wherein said image processing condition is a condition as to whether an image quality priority mode and a speed priority mode are set or not.

6. An image processing apparatus as claimed in claim 5, wherein the controller rewrites the configuration of the first and the second processing sections so that the sizes of the spatial filters used in the first and the second image processings are larger in the image quality priority mode than in the speed priority mode.

7. An image processing apparatus as claimed in claim 5, wherein the controller configures the first and the second processing sections so as to simultaneously operate in the image quality priority mode and to time-sharedly operate in the speed priority mode.

8. An image processing apparatus as claimed in claim 1, further comprising:
    an operation panel for setting the image processing condition.

9. An image processing apparatus as claimed in claim 1, wherein said controller rewrites the configuration of the line memories and the configuration of the first and the second processing sections so that the sizes of the spatial filters vary according to the image processing condition.

10. An image processing apparatus comprising:
    an image processing circuit comprising a device whose circuit configuration is rewritable, and including a first processing section performing a first image processing and a second processing section performing a second image processing;
    a memory for storing therein setting information for rewriting the configuration of the device;
    a setting device for selectively setting a first mode and a second mode; and
    a controller rewriting, by use of the setting information stored in the memory, the configuration of the first and the second processing sections so that the first and the second processing sections are configured so as to simultaneously operate in the first mode and to time-sharedly operate in the second mode.

11. An image processing apparatus as claimed in claim 10, wherein said controller assigns the number of line memories used in the first and the second processing sections in accordance with the mode set by the setting device.

12. An image processing apparatus as claimed in claim 11, wherein the first image processing is area determination in which area determination of image data is performed by use of a spatial filter, and the second image processing is MTF correction in which MTF correction of image data is performed by use of a spatial filter.

13. An image processing apparatus as claimed in claim 12, wherein the MTF correction of image data in the second image processing is performed in accordance with the result of the area determination in the first image processing.

14. An image processing apparatus as claimed in claim 10, wherein said first mode is an image quality priority mode and said second mode is a speed priority mode.

15. An image processing apparatus as claimed in claim 10, wherein the controller rewrites the configuration of the first and the second processing sections so that the sizes of the spatial filters used in the first and the second image processings are larger in the first mode than in the second mode.

* * * * *